United States Patent [19]

Peterson et al.

[11] Patent Number: 5,058,969
[45] Date of Patent: Oct. 22, 1991

[54] OPTICAL FIBER DISPENSING SYSTEM

[75] Inventors: Stanley P. D. Peterson; Gary R. Redford, both of Tucson, Ariz.

[73] Assignee: Hughes Aircraft Company, Los Angeles, Calif.

[21] Appl. No.: 521,197

[22] Filed: May 9, 1990

[51] Int. Cl.$^5$ .............................................. G02B 6/02
[52] U.S. Cl. .............................. 385/147; 57/63; 206/409; 242/18 R; 242/125; 242/157 R; 242/171; 244/3.12; 244/3.16; 385/134
[58] Field of Search ............... 350/96.10, 96.20, 96.29, 350/96.30; 57/59, 62, 63; 206/408, 409; 242/1, 4 R, 18 R, 27, 234, 309, 125, 128, 157 R, 170, 171; 250/227.11; 244/3.12, 3.16

[56] References Cited

U.S. PATENT DOCUMENTS

| | | | |
|---|---|---|---|
| 4,453,635 | 6/1984 | Heinzer et al. | 206/408 |
| 4,597,255 | 7/1986 | Hunter et al. | 57/62 |
| 4,889,295 | 12/1989 | McMoore, Jr. et al. | 242/1 X |
| 4,935,620 | 6/1990 | Schotter et al. | 250/227.11 |

Primary Examiner—John D. Lee
Attorney, Agent, or Firm—C. D. Brown; R. M. Heald; W. K. Denson-Low

[57] ABSTRACT

An optical fiber dispensing system (30) includes a canister (42) within which an optical fiber (12) is wound, and a helix dampener (40) that reduces the helical diameter of the optical fiber (12) as it is paid out from the canister (42) along a payout axis (20). The canister (42) is either a cylinder or a slightly tapered cone. The helix dampener (40) is a structure overlying the payout end of the canister (42) and extending beyond the canister (42) along the payout axis (20). The interior surface of the helix dampener (40) defines a locus (36) of points whose distance from the payout axis (20) decreases with increasing distance from the canister (42), to an opening (38) through which the optical fiber (12) is dispensed. The interior surface of the helix dampener (40) is preferably as a series of discontinuous rings (48) whose central opening diameter decreases with increasing distance from the canister (42), or as a smooth continuous axially symmetric surface (84) whose distance from the payout axis (20) decreases with increasing distance from the canister (42). The gradual reduction of the diameter of the helical pattern of the optical fiber (12) by the helix dampener (40) stabilizes the path of the optical fiber (12) prior to its exiting from the dispenser (30).

11 Claims, 2 Drawing Sheets

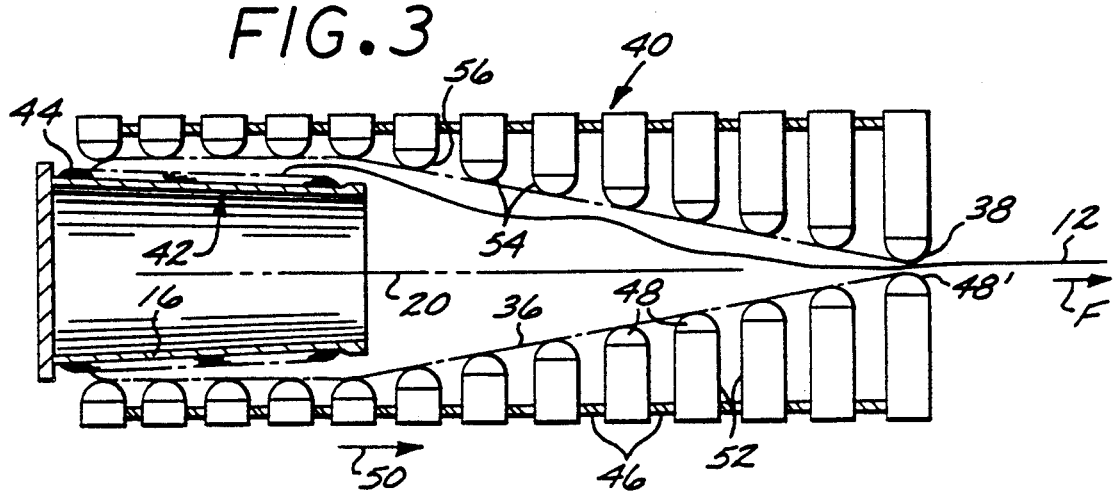
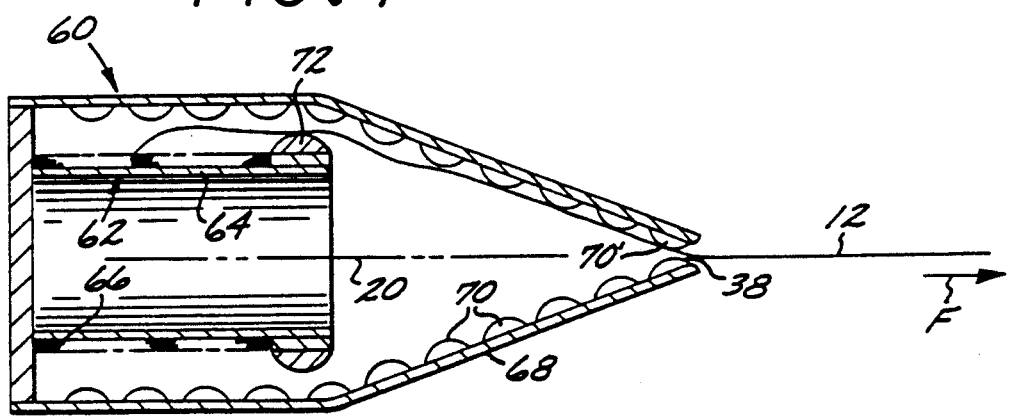
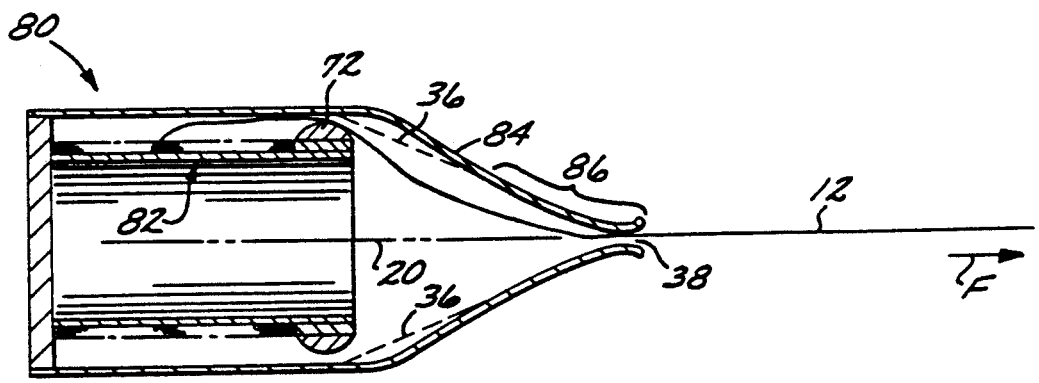

OPTICAL FIBER DISPENSING SYSTEM

REFERENCE TO RELATED APPLICATIONS

Cross-reference is made to related, copending Ser. No. 07/426,339 filed Oct. 24, 1989 (now U.S. Pat. No. 5,029,959) and assigned to the assignee of the present application.

BACKGROUND OF THE INVENTION

This invention relates to optical fibers, and, more particularly, to the dispensing of optical fibers from a canister within which they are wound.

Optical fibers are strands of glass fiber processed so that light beams transmitted therethrough are subject to total internal reflection. A large fraction of the incident intensity of light directed into the fiber is received at the other end of the fiber, even though the fiber may be hundreds of meters long. Optical fibers have shown great promise in communications applications, because a high density of information may be carried along the fiber and because the quality of the signal is less subject to external interferences of various types than are electrical signals carried on metallic wires. Moreover, the glass fibers are light in weight and made from a highly plentiful substance, silicon dioxide.

Glass fibers are typically fabricated by preparing a preform of glasses of two different optical indices of refraction, one inside the other, and processing the preform to a fiber. The optical fiber is coated with a polymer layer termed a buffer to protect the glass from scratching or other damage. As an example of the dimensions, in a typical configuration the diameter of the glass optical fiber is about 125 micrometers, and the diameter of the fiber plus the polymer buffer is about 250 micrometers (approximately 0.010 inches).

For such very fine fibers, the handling of the optical fiber to avoid damage that might reduce its light transmission properties becomes an important consideration. The optical fiber is typically wound onto a cylindrical or tapered bobbin with many turns adjacent to each other in a side-by-side fashion. After one layer is complete, another layer of optical fiber is wound on top of the first layer, and so on. The final assembly of the bobbin and the wound layers of optical fiber is termed a canister, and the mass of wound optical fiber is termed the fiber pack. When the optical fiber is later to be used, the optical fiber is paid out from the canister in a direction parallel to the axis of the bobbin and the canister, termed the payout axis.

It has been found by experience that, where the optical fiber is to be payed out from the canister in a rapid fashion, as for example over a hundred meters per second, the turns of optical fiber must be held in place on the canister with an adhesive. The adhesive holds each turn of optical fiber in place as adjacent turns and layers are initially wound onto the canister, and also as adjacent turns and layers are paid out. Without the use of an adhesive, payout of the optical fiber may not be uniform and regular, leading to snarls or snags of the fibers that damage them or cause them to break as they are payed out. On the other hand, the use of an adhesive requires attention to the "lift off" of each turn of optical fiber from the fiber pack, to ensure smooth payout.

In one application, an optical fiber is used to transmit sensor signals from, and guidance commands to, a moving vehicle from a stationary or moving controller. The canister is mounted in the rear of the vehicle, and the optical fiber payed out from the canister as the vehicle moves. The optical fiber must be payed out in a uniform manner without undue stress, to avoid breakage or kinking of the optical fiber.

In the past there has been some difficulty in achieving an acceptable payout of the optical fiber, particularly where both the vehicle carrying the canister and the controller are moving and turning during the payout process. Ensuring lift off of the optical fiber from the fiber pack and minimizing frictional effects have been of particular concern. There is therefore a need for an improved approach to optical fiber payout from a canister. The present invention fulfills this need, and further provides related advantages.

SUMMARY OF THE INVENTION

The present invention provides an optical fiber dispensing system which includes a canister having an optical fiber wound thereupon, and a structure to improve the payout of the optical fiber from the canister. The dispenser improves optical fiber separation and lift off from the fiber pack of the canister. The improved payout characteristics of the dispenser permit the reduction and possible elimination of adhesive, thereby reducing peel point bending stresses that can damage the optical fiber or reduce light transmission therethrough. The canister can be easier to wind as a result. The dispenser also reduces the interaction of the optical fiber trailed behind the moving vehicle with the moving vehicle, reducing the chances of damage to the optical fiber and also permitting the canister to be recessed within the vehicle for improved protection of the optical fiber of the fiber pack.

In accordance with the invention, an optical fiber dispensing system comprises a canister having an optical fiber wound therein, the optical fiber being arranged to pay out from the canister in a helical pattern along a payout axis thereof; and means proximate the canister for dampening the helical motion of the optical fiber with increasing distance from the canister.

As the optical fiber is payed out parallel to the payout axis of the canister without such a dampening means, it traces a helical pattern that introduces a periodic transverse movement into the optical fiber. The magnitude of the transverse movement gradually decays with increasing distance from the canister, until it is barely perceptible at a large distance from the canister.

The present invention provides that the transverse movement be damped out much faster than would naturally be the case, preferably through the use of a helix dampener that extends from the canister along the payout axis. The interior surface of the helix dampener defines a locus of points whose distance from the payout axis decreases with increasing distance from the canister. The dampener structure is preferably a series of rings of decreasing diameter or a funnel-shaped body. At the end of the helix dampener remote from the canister is an opening through which the optical fiber is drawn, the opening being sized such that the maximum permissible transverse vibrational amplitude of the optical fiber as it passes through the opening is acceptably small.

The invention also extends to a process for dispensing an optical fiber. In accordance with this aspect of the invention, a process for dispensing optical fiber comprises the steps of providing a canister having an optical fiber wound thereupon; paying out the optical fiber from the canister in a helical pattern parallel to a payout axis of the canister; and dampening the helical pattern of the optical fiber proximate the canister so that the helical radius of the optical fiber pattern is less than it would naturally be without the dampening.

The approach of the invention results in improved payout of the optical fiber from the canister. "Blooming", an unconstrained lateral vibration of the optical fiber after it has left the canister, is greatly reduced. Possible mechanical and aerodynamic interference between the payed out optical fiber and the moving vehicle containing the canister is reduced. Other improvements to the canister system are made possible by this approach. Other features and advantages will be apparent from the following more detailed description of the preferred embodiment, taken in conjunction with the accompanying drawings, which illustrate, by way of example, the principles of the invention.

BRIEF DESCRIPTION OF THE DRAWINGS

FIG. 3 is a diagrammatic side view of a preferred optical fiber dispenser;

FIG. 4 is a side sectional view of an alternative embodiment of an optical fiber dispenser; and FIG. 5 is a side sectional view of a third embodiment of an optical fiber dispenser.

DETAILED DESCRIPTION OF THE INVENTION

Figure 1:
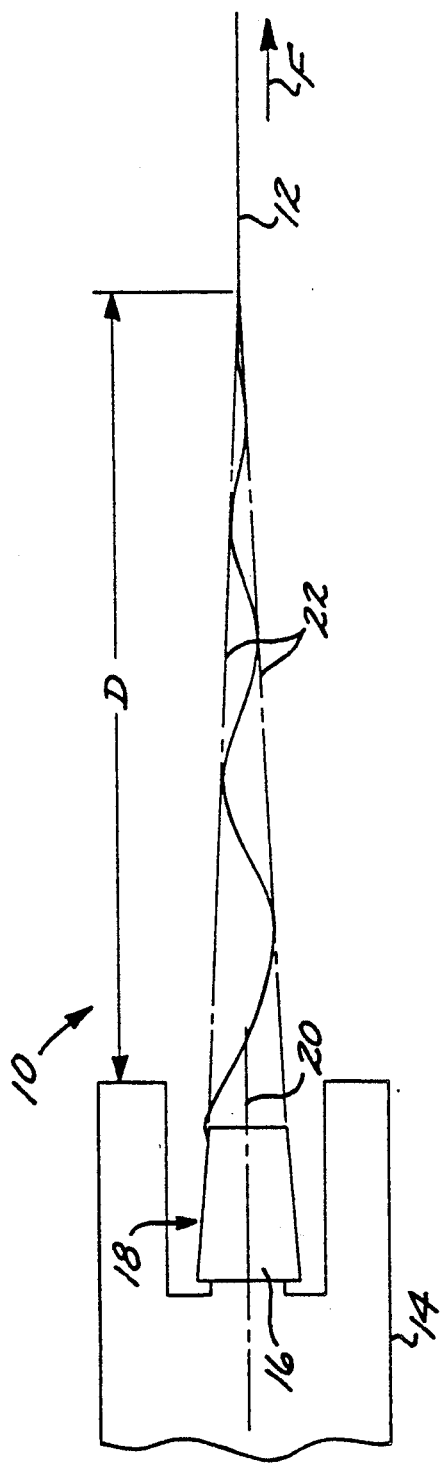
FIG. 1 is a diagrammatic side view of a conventional payout system for an optical fiber and the helical path followed by the optical fiber.

A conventional payout system 10 for payout of an optical fiber 12 from a moving vehicle 14 is illustrated in FIG. 1. The optical fiber 12 is wound onto a bobbin 16, the wound pack of optical fiber 12 and the bobbin 16 together forming a canister 18. During payout, the optical fiber 12 is unwound from the canister 18 by the application of a payout force F. The vehicle 14 may be moving with the optical fiber 12 held relatively motionless (stationary controller), or the vehicle 14 may be moving with the optical fiber 12 also moving in the same general direction but at a lower velocity (moving controller).

The optical fiber 12 is payed out from the canister 18 along a payout axis 20. The bobbin 16 is cylindrical or conical with a taper of less than about 5 degrees, and the payout axis 20 generally coincides with the respective cylindrical or conical axis of the bobbin 16 and canister 18. The manner of payout causes the optical fiber 12 to assume a helical pattern 22 as the separation point at which the optical fiber 12 separates from the bobbin 16 travels around the circumference of the bobbin 16. Alternatively, the pattern followed by the optical fiber 12 can be viewed as one of periodic transverse motion in the direction perpendicular to the payout axis 20.

The helical pattern 22 of the optical fiber 12 persists for some distance behind the moving vehicle 14. At a distance D from the canister 18, the helical pattern becomes damped out and the magnitude of the transverse motion becomes so small that the optical fiber 12 may be regarded as substantially straight, except for curvature introduced as the vehicle 14 turns. The distance D may be many times the length of the canister 18, with the helical pattern 22 extending well behind the vehicle 14. This extended helical pattern 22 can interfere with the smooth payout of the optical fiber 12 and even with the vehicle 14. Moreover, it has been observed that the unconstrained helical pattern 22 can interfere with the manner in which the optical fiber 12 separates from the fiber pack on the bobbin 16.

In accordance with the invention, an optical fiber dispensing system comprises a canister having an optical fiber wound therein, the optical fiber being arranged to pay out from the canister along a payout axis thereof; and a helix dampener disposed overlying the canister and extending beyond the canister in the direction parallel to the payout axis, the interior surface of the helix dampener defining a locus of points whose distance from the payout axis decreases with increasing distance from the canister to an opening through which the optical fiber is dispensed.

In a preferred application, the optical fiber dispensing system is used in an optically guided missile. In accordance with this aspect of the invention, an optically guided missile comprises an elongated, generally cylindrical missile body; a sensor in one end of the missile body; a missile guidance unit within the body of the missile that receives sensor signals from the sensor and introduces message signals into an optical fiber; a canister having a length of the optical fiber wound therein at the other end of the missile body, the optical fiber being arranged to pay out from the canister along a payout axis thereof; and a helix dampener disposed overlying the canister and extending beyond the canister in the direction parallel to the payout axis, the interior surface of the helix dampener defining a locus of points whose distance from the payout axis decreases with increasing distance from the canister to an opening through which the optical fiber is dispensed.

Figure 2:
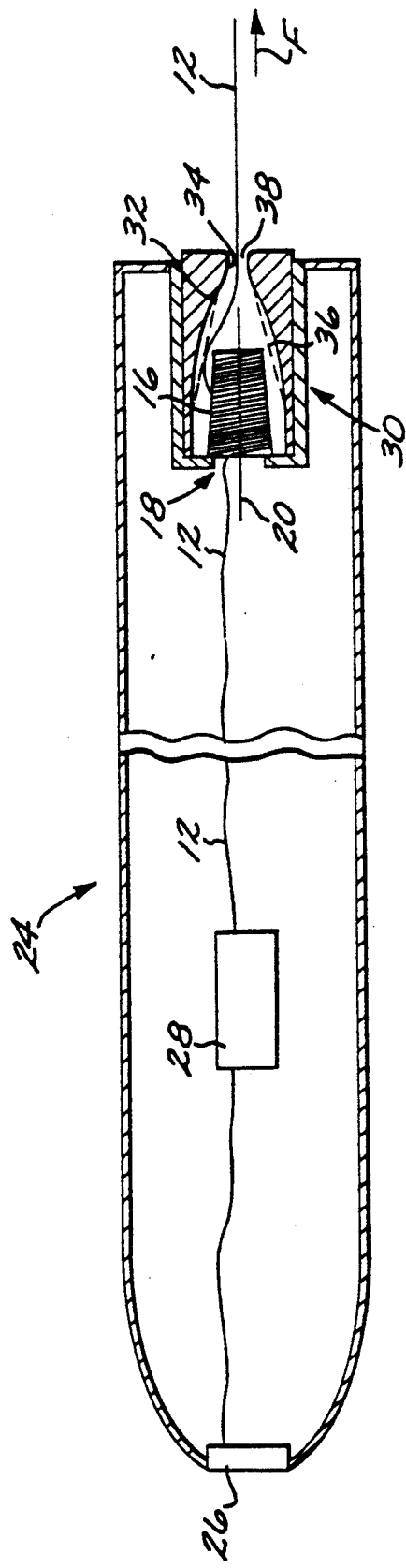
FIG. 2 is a side sectional view of the dispenser system of the present invention and the dispensed optical fiber, mounted in an optically guided missile.

FIG. 2 illustrates a missile 24 having a sensor 26 in one end thereof. A missile guidance unit 28 within the body of the missile 24 receives signals from the sensor 26. An optical fiber dispenser 30 includes a length of the optical fiber 12 wound upon the bobbin 16 of the canister 18. The canister 18 is mounted on the opposite end of the missile 24 from the sensor 26, and payout of the optical fiber 12 is made in the direction generally parallel to the payout axis 20. One end of the optical fiber 12 is connected to the missile guidance unit 28, while the other extends to a stationary controller (not shown) on the ground or in another vehicle.

The optical fiber dispenser includes a helix dampener 32, mounted over the canister 18 and extending rearwardly from the canister 18 in the direction toward which the optical fiber 12 is paid out from the canister 18. The helix dampener 32 includes an interior surface 34 that defines a locus of points 36 whose distance from the payout axis 20 decreases with increasing distance from the canister 18 in the direction toward which the optical fiber 12 is paid out. The helix dampener 32 has an opening 38 in the end thereof remote from the canister 18, the opening 38 having a diameter that is substantially smaller than the diameter of the canister 18, and typically is only about ½ inch in diameter.

The helix dampener 32 removes the transverse component of the movement of the optical fiber 12 at the location of the opening 38 by a mechanical dampening effect. Thus, the optical fiber 12 emerging from the opening 38 follows a substantially straight line. Alternatively stated, the helical motion of the optical fiber 12 illustrated in FIG. 1 is entirely removed in a distance that is much less than the normal, unconstrained distance for removal, D in FIG. 1.

The helical motion of the optical fiber 12 is confined to a much shorter length, preferably less than about two lengths of the canister, during payout with the approach of the invention. The optical fiber 12 emerges from the back of the vehicle 14 from a nearly point source at the opening 38, rather than in a helical pattern. The optical fiber 12 does follow a rapidly damped helical pattern inside the helix dampener 32 before emerging from the opening 38 and vehicle 14, but thereafter has no transverse component of motion resulting from the manner of payout. (Some transverse motion of the optical fiber may, however, arise after the optical fiber leaves the opening due to other factors.)

Alternative structures of the helix dampener 32 are illustrated in more detail in FIGS. 3-5. A preferred ring-type helix dampener 40 is shown in FIG. 3, together with a conical canister 42. The optical fiber 12 is wound as a fiber pack 44 upon the bobbin 16, which in this case is conical with a taper of about 3 degrees.

The helix dampener 40 includes a cylindrical support shell 46 and a plurality of rings 48 supported along the length of the shell 46. The shell 46 is of sufficient diameter that it fits over the canister 42, and extends a distance in a payout direction 50. Each ring 48 is supported from the shell 46 by a ring support 52.

The diameters of the rings 48 decrease with increasing distance from the canister 42 in the payout direction 50. The ring supports 52 are dimensioned to support the rings 48 concentrically with the payout axis 50, so that the ring supports 52 further from the canister 42 must extend further inwardly than the ring supports 52 nearer the canister 42. The ring 48 furthest from the canister 42, here indicated as the ring 48', forms the opening 38 through which the optical fiber 12 passes out of the helix dampener 40.

The mutual tangents to the rings 48 define the locus of points 36 within which the optical fiber 12 is constrained while it is within the interior of the helix dampener 40. Since the applied payout force F is effectively applied from the center of the opening 38, the helical pattern followed by the optical fiber 12 converges toward the opening 38. Any tendency for the helical pattern to diverge to a larger transverse amplitude is checked by contact of the optical fiber 12 with one of the rings 48.

The rings 48 are preferably formed with a rounded interior diameter 54. The rounded surface 54 prevents snagging of the optical fiber 12 by the rings 48 as the optical fiber 12 moves rapidly past the rings 48. The rings 48 may be made of a solid material having a low coefficient of friction, such as teflon (polytetrafluoroethylene), to reduce the force F required to effect payout. A reduction in this force reduces the likelihood of failure or crimping of the optical fiber, and also reduces the severity of the angle through which the optical fiber is bent as it separates from the fiber pack. Since the fractional optical transmission of the optical fiber decreases with increasing severity of bends to which it is subjected, the reduction of the force F contributes to improved system performance.

The rounded surface 54 also prevents an accumulation of adhesive on the interior diameter of the ring 48, where the optical fiber 12 is retained on the bobbin 16 with an adhesive. Any adhesive transferred from the optical fiber 12 to one of the rings 48 is forced to a lee side 56 of the ring 48. Any accumulated adhesive on the lee side 56 cannot exert a drag force on the optical fiber 12, nor can it be transferred back to the optical fiber at another location that passes the ring at a later time.

Another form of helix dampener 60 is illustrated in FIG. 4. In this case, a canister 62 includes a cylindrical bobbin 64 upon which the optical fiber 12 is wound as a fiber pack 66. The helix dampener 60 includes a shell 68 that is cylindrical in the portion overlying the canister 62, and then is tapered inwardly in the portion that extends in the payout direction 50 rearwardly from the canister 62. A plurality of rings 70 are mounted directly to the interior wall of the shell 68, without the need for separate ring supports. The ring 70' furthest from the canister 62 forms the opening 38.

A further feature of the dispenser of FIG. 4 is a helix expansion ring 72 attached to the rearward end of the canister 62. The ring 72 forms a radial enlargement of the canister 62 over which the optical fiber 12 must rise and pass during payout. The helix expansion ring 72 provides a flange against which the fiber pack 66 can be wound, so that there is no need for a special set back type of winding format at the end of each layer of optical fiber in the fiber pack to keep each layer in place. The adhesive normally used to hold the optical fiber in place in the layer can also be reduced or even eliminated in some cases when the expansion ring configuration is used. As the optical fiber 12 is paid out from the fiber pack 66, it passes radially outwardly over the helix expansion ring 72 before converging inwardly as the helix is damped so that the optical fiber can pass through the opening 38.

Yet another form of helix dampener 80 is illustrated in FIG. 5. In this case, a canister 82 is illustrated as the same type as depicted in FIG. 4. The helix dampener has a shell 84 that is cylindrical in the portion that fits over the canister 82, but which tapers inwardly toward the payout axis 20 with increasing distance from the canister 82. In this portion the shell 84 could be conical, but may generally be of any converging form such as illustrated in FIG. 5. At least a portion of the interior of the shell 84 defines the locus of points 36 within which the optical fiber 12 is confined during payout. As with the other forms of helix dampener, the helix dampener 80 has an opening 38 through which the optical fiber 12 passes as it leaves the dispenser.

The principal potential disadvantage of the solid converging dispenser of the type illustrated in FIG. 5 is that there may be an increased level of friction in regions 86 over which there may be an extended length of contact between the interior of the shell 84 and the optical fiber 12. To minimize the adverse effect of such friction, the optical fiber 12 may be coated with a small amount of a lubricant such as graphite or silicon in the fiber pack. The lubricant is carried with the optical fiber during payout, and reduces the friction in contact regions 86.

The optical fiber dispenser of the invention confines the helical motion of the optical fiber during payout to a much shorter length than would otherwise be the case. The reduction of the helical pattern reduces the likelihood of damage to the optical fiber by contact with the structure or exhaust plume of the missile. It also reduces the radar signature of the missile and turbulence around the missile that can interfere with its guidance. The helical dampener also causes the optical fiber to lift up from the bobbin more readily, thereby causing the optical fiber to lift over the helix expansion ring (where present) more easily and reducing friction between the optical fiber and the fiber pack.

The optical fiber dispenser of the invention thus provides an advance in the art of rapid payout of optical fibers from canisters. Although particular embodiments of the invention have been described in detail for purposes of illustration, various modifications may be made without departing from the spirit and scope of the invention. Accordingly, the invention is not to be limited except as by the appended claims.

What is claimed is:

1. An optical fiber dispensing system, comprising:
   a canister having an optical fiber wound therein, the optical fiber being arranged to pay out from the canister along a payout axis thereof; and
   a helix dampener disposed overlying the canister and extending beyond the canister in the direction parallel to the payout axis, the interior surface of the helix dampener defining a locus of points whose distance from the payout axis decreases with increasing distance from the canister to an opening through which the optical fiber is dispensed.

2. The dispensing system of claim 1, wherein the canister is cylindrical, and the payout axis is coincident with the cylindrical axis of the canister.

3. The dispensing system of claim 2, wherein the canister further includes a helix expansion ring of increased cylindrical diameter at the end of the canister from which the optical fiber is paid out.

4. The dispensing system of claim 1, wherein the canister is conical, with a conical taper of less than about five degrees, and the payout axis is coincident with the conical axis of the canister.

5. The dispensing system of claim 1, wherein the dampener includes a plurality of dampener rings arranged at increasing distance from the canister, the rings that are closest to the canister having a ring diameter greater than the rings that are farther from the canister, the dampener rings having a rounded inner surface to prevent snagging of the optical fiber thereupon.

6. The dispensing system of claim 5, wherein the inner surfaces of the dampener rings are made of polytetrafluoroethylene.

7. The dispensing system of claim 5, wherein the inner surfaces of the dampener rings are lubricated.

8. The dispensing system of claim 1, wherein the interior surface of the dampener is a continuous funnel-shaped surface.

9. The dispensing system of claim 1, wherein the opening in the dampener is not more than two lengths of the canister in distance from the canister.

10. An optically guided missile, comprising:
    an elongated, generally cylindrical missile body;
    a sensor in one end of the missile body;
    a missile guidance unit within the body of the missile that receives sensor signals from the sensor and introduces message signals into an optical fiber;
    a canister having a length of the optical fiber wound therein at the other end of the missile body, the optical fiber being arranged to pay out from the canister along a payout axis thereof; and
    a helix dampener disposed overlying the canister and extending beyond the canister in the direction parallel to the payout axis, the interior surface of the helix dampener defining a locus of points whose distance from the payout axis decreases with increasing distance from the canister to an opening through which the optical fiber is dispensed.

11. The missile of claim 10, wherein the helix dampener includes a plurality of dampener rings arranged at increasing distance from the canister, the rings that are closest to the canister having a ring diameter greater than the rings that are farther from the canister, the dampener rings having a rounded inner surface to prevent snagging of the optical fiber thereupon.

* * * * *